Sept. 21, 1971 G. W. BALZ 3,606,702
APPARATUS FOR TREATING ARTICLES THEREFOR
Original Filed May 29, 1967 5 Sheets-Sheet 1

INVENTOR
Gunther W. Balz

ATTORNEYS

Sept. 21, 1971  G. W. BALZ  3,606,702
APPARATUS FOR TREATING ARTICLES THEREFOR
Original Filed May 29, 1967  5 Sheets-Sheet 3

Fig. 5

INVENTOR
Gunther W. Balz

Hueschen & Kurlandsky
ATTORNEYS

INVENTOR
Gunther W. Balz

United States Patent Office 3,606,702
Patented Sept. 21, 1971

3,606,702
APPARATUS FOR TREATING ARTICLES THEREFOR
Gunther W. Balz, Kalamazoo, Mich., assignor to Roto-Finish Company, Kalamazoo, Mich.
Original application May 29, 1967, Ser. No. 641,762, now Patent No. 3,466,815, dated Sept. 16, 1969. Divided and this application Jan. 8, 1969, Ser. No. 789,904
Int. Cl. B24b 31/06; F16h 33/02
U.S. Cl. 51—163                9 Claims

ABSTRACT OF THE DISCLOSURE

Novel method for treating articles, e.g., finishing metal parts, by introducing the articles into a treating zone, if desired together with treating material, moving the articles in an orbital path and, while continuing orbital movements, subjecting the articles to periods of increased and decreased velocity of linear processional motion in a direction substantially perpendicular to the plane of orbital motion, thereby facilitating control of dwell time within the treating zone and facilitating discharge of articles from the treating zone. Apparatus for carrying out said method, e.g., a finishing machine, comprising a curvilinear trough, e.g., annular or helical, resiliently mounted for vibration, having a vertically mounted vibratory motor provided with eccentric weights on its shaft, and including means for changing phase relationship between the eccentric weights while the vibratory motor is in operation, thereby increasing and decreasing the linear processional motion along the chamber for attaining the desired results already stated is claimed.

REFERENCE TO RELATED APPLICATIONS

This application is a division of U.S. Ser. No. 641,762 filed on May 29, 1967, now U.S. Pat. 3,466,815.

BACKGROUND OF THE INVENTION

The present invention relates to machines having a vibratory motor with a shaft oriented in a substantially vertical position, eccentric weights mounted on the shaft, and means for readily adjusting the relative positions of the eccentric weights for carrying out the method of the invention.

Vibratory machines such as finishing machines having vertically oriented motors are known in the art. Such machines are used for various forms of finishing, such as abrading, burr removal, burnishing, polishing and grinding. In U.S. Patent No. 3,161,993 are disclosed seveal forms of machine comprising a finishing chamber in the form of a helical trough resiliently mounted on a base and having a vertically arranged vibratory motor for vibrating the chamber. Similar finishing machines of this type have been disclosed, as for example in my U.S. application Ser. No. 414,101 filed Nov. 27, 1964, now U.S. Patent No. 3,400,495, issued Sept. 10, 1968, wherein the chamber is in the form of an annular trough horizontally arranged. Machines of the type described are vibrated in such a manner that a gyratory motion is produced, that is, a motion wherein the axis of the vibrating portion of the machine is inclined from the vertical and describes substantially a pair of conical surfaces as it gyrates. As a result of this type of gyratory motion, when material such as parts and/or refinishing material are placed in the vibrating chamber, orbital motion is imparted to the material so that it moves upwardly at the peripheral portion of the chamber and downwardly at the inner portion of the chamber. This results in relative movement between the finishing material and parts, causing the parts to be finished. Additionally, as for example in the apparatus described in the above-identified patent and application, it is desirable to cause procession or linear progression of the material around the chamber of the apparatus. This is desirable, for example, where the parts are to be automatically discharged at a discharge station within the apparatus.

As is well known in the art, the production of linear motion and orbital motion in a mass confined in a chamber is dependent upon many factors, including the utilization of and the relative placement of eccentric weights, where such apparatus is employed. Moreover, the geometric relationship of the vibratory means including the motor and eccentric weights to the center of mass of the suspended apparatus is also a determining factor with regard to the nature of the motion imparted to the finishing mixture. Further important factors are the number of eccentric weights used, their relative positioning, their absolute mass, and their relative mass. Additionally, where two or more eccentric weights are utilized, their phase relationship is also a significant factor, particularly with regard to progression of the finishing mixture linearly along the finishing chamber, and to some degree with respect to the orbital motion of the mixture.

Normally little difficulty is experienced in obtaining proper orbital motion of the finishing mixture. Even a single eccentric weight when properly displaced from the center of mass of the suspended system will provide suitable orbital motion. The direction of orbital motion is generally the same, regardless of the direction of linear motion, that is, in a direction such that the material rises in the outer or peripheral zone of the chamber or trough and descends at the inner or central zone thereof. However, in order to provide procession or progression of the mixture in a linear direction, and in order to be able to determine and establish the direction of progression, it is desirable to utilize at least two separate eccentric weights, one affixed to each end of the motor shaft, and to establish a proper phase relationship between the eccentric weights. The direction of linear motion depends upon whether the upper eccentric weight is displaced clockwise or counterclockwise with respect to the lower weight. If the upper weight is displaced clockwise through an angle less than 180 degrees, the direction of linear motion is counter-clockwise, regardless of the direction of rotation of the motor. When the upper weight is displaced counter-clockwise through an angle less than 180 degrees with respect to the lower weight, the direction of linear motion of material within the trough, e.g., parts to be finished and particulate finishing material, is clockwise, again regardless of the direction of motor rotation. The preferred positioning of the weights for normal operation is usually about 45 degrees apart, either clockwise or counter-clockwise. Frequently, counter-clockwise rotation of the grinding mixture is desired, in which case the upper weight should be displaced about 45 degrees clockwise from the lower weight. Numerous other variations may be used to impart desirable linear and orbital motion to a finishing mixture and are well within the skill of the art.

In prior art finishing machines the eccentric weights are generally bolted or clamped to the motor shaft. Adjustment of eccentric weights to proper relative positions is difficult and time-consuming. After the settings are changed from one position to another, to provide different finishing characteristics dependent upon the type of parts to be finished and finishing material used, there is no simple way to return the weights to a previously determined position setting, and the operator must usually again experiment with the settings in order to find proper relative positions. In the employment of finishing machines of the type described, whether utilizing spiral, helical, or horizontal annular chambers, it is desirable to be able to use a continuous one-pass operation so that the equipment can be tied in with overall production line automation. However, one-pass continuous operation has generally not been practical with available equipment, considering limitations of time and dependable sequential unloading. For example, if the rate of procession or linear movement of finishing material and parts is slowed down so that parts can be sufficiently finished in one pass, the rate of flow of finishing material at the other end of the machine is not sufficient. As a result, there is not sufficient flotation or lift to cause relatively heavy or large parts to rise up out of the mass sufficiently for separation from finishing material and exit from the machine. If the flow of finishing material and parts is increased sufficiently to avoid this problem, the cycle has been speeded up to the point where satisfactory processing cannot be effected in one pass within space limitations of the apparatus, since extending the length of the chamber to enable a greater distance to be traversed by the parts and finishing material would unduly increase the bulk of the apparatus and render it impractical and uneconomical. Moreover, any procedure which would involve stopping the apparatus for adjustments of the phase relationship of the eccentric weights during the process would add expense and increase finishing time.

SUMMARY OF THE INVENTION

It is accordingly an object of the present invention to provide apparatus, e.g., a finishing machine, comprising a curvilinear trough, e.g., annular or helical, resiliently mounted for vibration, having a vertically mounted vibratory motor provided with eccentric weights on its shaft, and including means for changing phase relationship between the eccentric weights while the vibratory motor is in operation, thereby increasing and decreasing the linear processional motion along the chamber for attaining the desired results already stated. Another object of the present invention is to provide an improved vibratory apparatus for carrying out the process having a vibratory motor assembly vertically mounted therein, said vibratory motor having at least two eccentric weights mounted on the ends thereof. It is a further object to provide an apparatus having a vibratory motor assembly of the type described wherein at least one of the eccentric weights is rotatively adjustable with respect to the other so that the phase relationship between the two weights may be adjusted while the apparatus is in operation. Additional objects and advantages will be apparent to one skilled in the art and still other advantages will become apparent hereinafter.

According to the invention a novel method is provided for treating an article which comprises moving the article in an orbital path and, without interrupting the orbital motion, applying one or more cycles of increased and decreased velocity of linear processional motion in a direction substantially perpendicular to the plane of orbital motion. By properly regulating the length of time for each part of the cycle, the dwell time within the treating zone may be controlled precisely. Additionally, by properly regulating the cycles, articles may be treated while maintained in spaced apart relationship within the treating zone, while the dwell time within the treating zone is also controlled. By timing the cycles so that a period of increased velocity takes place when the article reaches the end of the treating zone, increased force is provided for facilitating removal of the article from the treating zone. Additionally, according to the invention, a finishing machine of the spiral or helical or horizontally annular type is provided having a motor so positioned that its shaft is vertically oriented. Unbalanced or eccentric weights are provided at each end of the motor shaft. Means is provided whereby the position of at least one of the eccentric weights may be changed while the motor is in operation. As a result, one or more cycles comprising periods of increased or decreased linear processional motion may be provided by properly readjusting the relative positions of the eccentric weights to enable the novel method of the invention to be carried out. Additionally, the relative positions of the eccentric weights may be changed when an article is ready to be discharged from the apparatus to provide the increased linear force necessary for accomplishing such discharge.

In another method of using the apparatus described above, the treating zone or chamber may be divided into a plurality of zones or chambers by utilizing a plurality of cycles of increased and decreased linear processional velocity. For example, during each cycle an article or group of articles may be loaded into the treating chamber. The articles proceed during the increased velocity portion of the cycle to a certain area spaced apart from the loading zone. The linear processional velocity may then be decreased or stopped completely while the articles are caused to undergo orbital motion in a plane substantially perpendicular to the direction of linear motion. At the end of a particular period of treatment, linear velocity may be increased again to begin another cycle, moving the articles being treated a short distance, and then stopping the linear motion again to permit continued treatment in a new area. Additional articles may be introduced at a particular time during each cycle. The articles assume spaced apart positions corresponding to the travel distance during the increased linear motion part of the cycle. By proper selection of the relative times for decreasing and increasing the linear motion, the articles may be spaced apart a desired distance throughout the extent of the chamber or treating zone. The process may be so controlled that when an article reaches the end of the treating zone or chamber, the next portion of the cycle of increased linear motion causes the article to be discharged from the zone or chamber.

As used herein in the specification and claims, the term "substantially perpendicular" refers to the direction of the finishing material, or part, as noted at any particular instant, with regard to the plane or planes described by the particles of the finishing mixture or part as it undergoes orbital vibration. As will be apparent, the orbital motion of the part or particles of the mixture may not be strictly in a plane but, because of the superimposed linear motion in question, may define a torus. Moreover, it will be clearly understood that, when an annular or helical finishing chamber is used, the overall processional motion is more strictly a large circle or a large helix, and that at any given instant only the processional motion with respect to any particular plane described by the orbital motion of a particle or part is in any sense absolutely perpendicular.

BRIEF DESCRIPTION OF THE DRAWINGS

The invention in its preferred embodiment is illustrated by the accompanying drawings in which.

DESCRIPTION OF THE PREFERRED EMBODIMENTS

Reference is now made to the accompanying drawings for a better understanding of the invention, wherein all the parts are numbered and wherein the same numbers are used to refer to corresponding parts throughout.

Figures 1, 2, 3:
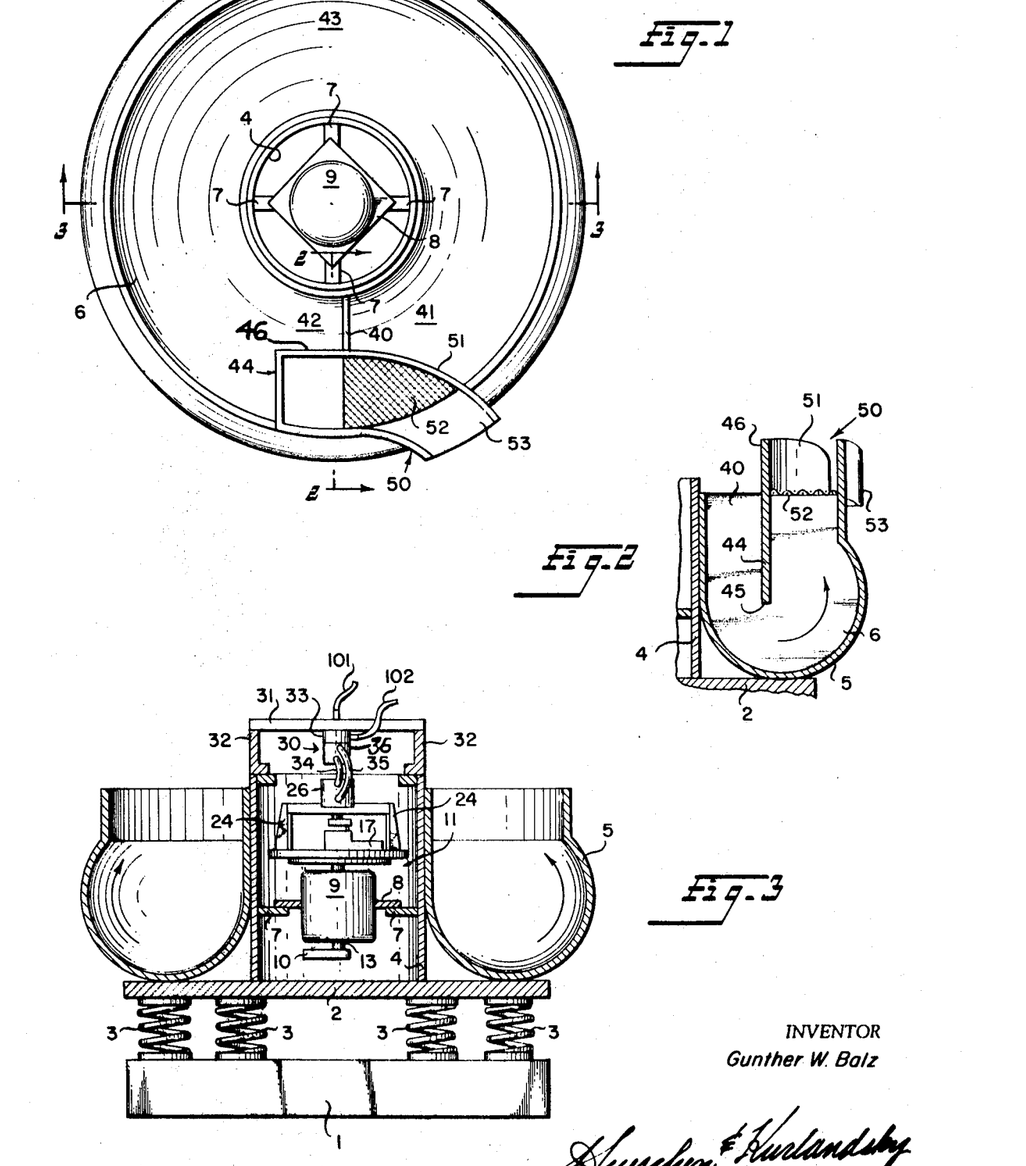
FIG. 1 is a top view of an apparatus according to the invention.
FIG. 2 is a fragmentary cross-section of the apparatus taken at the line 2—2 of FIG. 1.
FIG. 3 is a cross-sectional view taken at the line 3—3 of FIG. 1.

Referring to FIGS. 1–3, a finishing apparatus is shown comprising a base 1, a supporting plate 2 mounted on the base 1 by means of coil springs 3 and a tubular support 4 mounted on the plate 2. Also mounted on the plate 2 and surrounding the supporting member 4 is an annular trough 5 defining a finishing chamber 6. The trough is disposed in a horizontal plane. Alternatively, it may be in the form of an incline, spiral, helix, or the like. A motor bracket 7 is mounted within the tubular support 4, having affixed thereto the flange 8 of a motor 9. An eccentric weight 10 is affixed to the lower end of the motor shaft 13.

Figure 4:
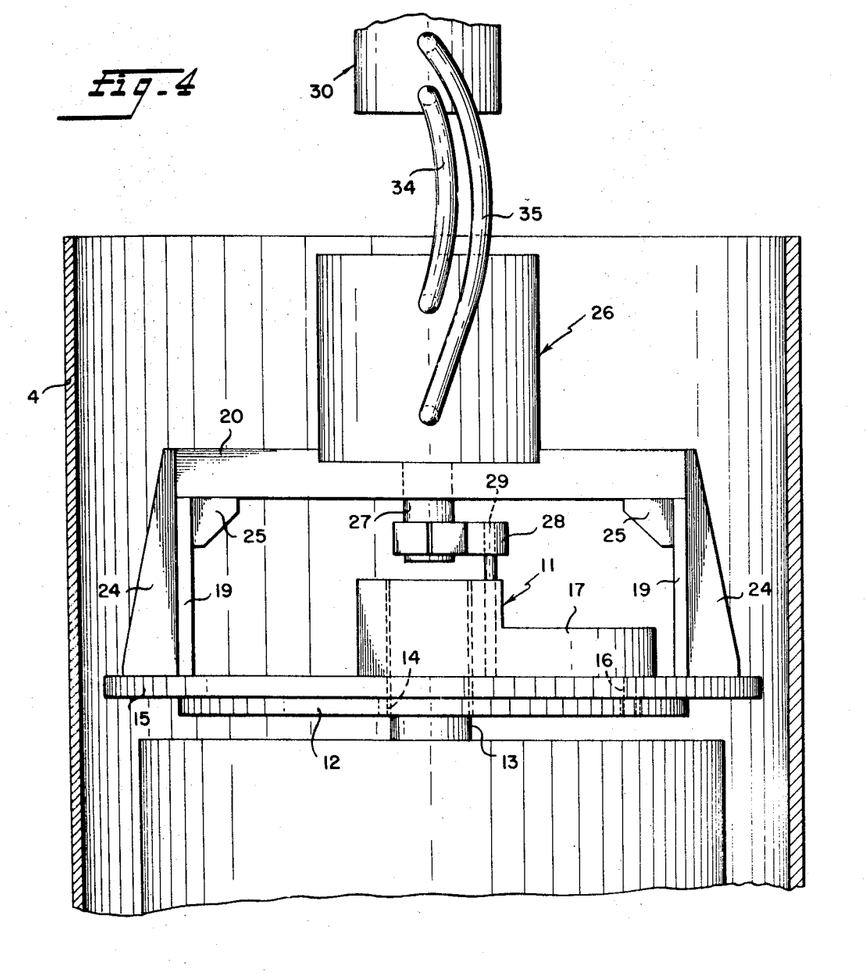
FIG. 4 is an enlarged fragmentary elevational view of the apparatus shown in FIG. 2.

As shown in greater detail in FIG. 4, an adjustable eccentric weight assembly 11 is mounted on the upper end of the shaft 13 of the motor 9. The adjustable eccentric weight assembly 11 is comprised of an index plate 12 connected to the motor shaft 13 by means of a key 14. A base plate 15 is rotatably mounted over the shaft 13 and rotatably fixed with respect to the index plate by means of a drive pin 16 affixed through an aperture in the base plate and engaged in an aperture provided in the index plate. A series of apertures may be provided in the index plate to enable the base plate to be fixed with respect to the index plate in any one of a number of desired positions. An adjustable eccentric weight 17 is rotatably mounted on the shaft 13 in contact engagement with the upper surface of the base plate 15.

A frame assembly 18 is fixedly mounted on the base plate 15 and comprises vertical plates 19, horizontal members 20, horizontal plates 21, 22 and 23, vertical buttress members 24, and corner reinforcements 25.

A rotary actuator 26 is fixedly mounted on the horizontal plate 22 and has a drive shaft 27 extending below the actuator and a shifting arm 28 clamped thereto. The shifting arm 28 engages a drive pin 29 which is mounted in an aperture provided in the eccentric weight 17.

Figure 5:
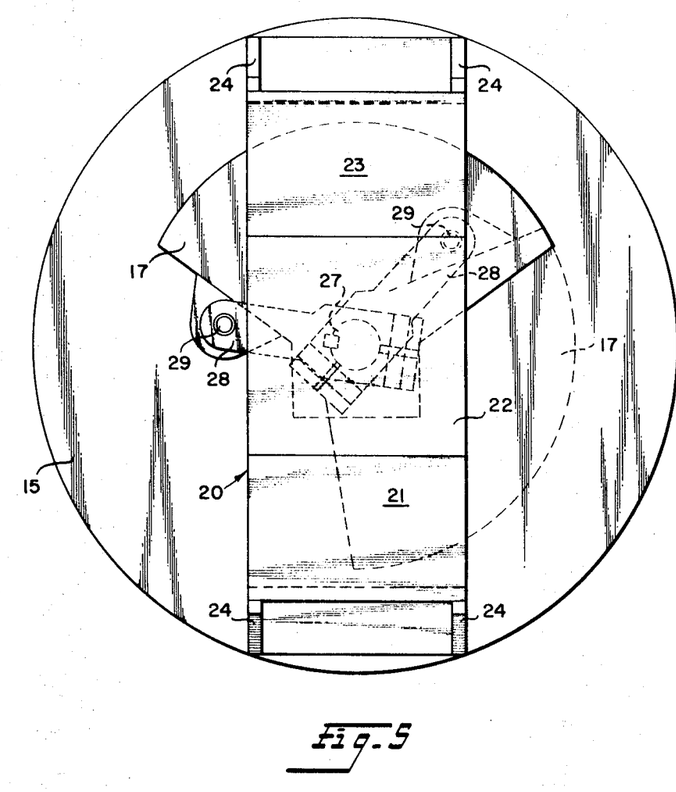
FIG. 5 is a top view of the apparatus of FIG. 4.

A rotary coupling 30 is mounted on a horizontal frame member 31 which is in turn supported by vertical frame members 32, shown in FIG. 3. The rotary coupling 30 comprises a fixed member 33 fixedly mounted on the frame member 31, and a rotating member 36. The ports of the rotating member are connected to the ports of the actuator 26 by air linings, ducts, or tubes 34 and 35. The rotary coupling 30 serves the function of transferring the power transfer medium such as air or other hydraulic fluid from a fixed position of the apparatus to the rotary actuator 26, where the medium provides the force for operating the actuator. FIG. 5 illustrates one fixed position of the adjustable weight assembly in solid lines and the other fixed position in broken lines.

As further shown in FIGS. 1 and 2, the apparatus for removing the finishing mixture from the chamber, separating the parts from the finishing material and discharging the parts comprises a transverse diaphragm, dam, or bulkhead 40 separating the finishing chamber into a charging or receiving zone 41 on one side and a discharge zone 42 on the other. For certain applications the diaphragm 40 is preferred whereas, for other applications, it may be dispensed with. The remainder of the chamber comprises a finishing zone 43 including the major proportion of the overall chamber. Mounted at the diaphragm 40 is a discharge apparatus comprising an elevator duct 44, shown in the drawings as substantially a vertical tube having a rectangular cross-section, with its lower end 45 defining an entry port positioned within the trough of the finishing chamber below the surface of the mass of the finishing mixture, and in the extra-median (i.e., circumferentially outer) zone of the trough, and with its upper end 46 defining an exit or discharge port positioned above the level of the finishing mixture, and preferably above the top of the trough, as shown in the drawings.

As used herein the term "extra-median zone" refers to that portion of the finishing chamber which is radially external to an imaginary vertical median plane bisecting the chamber into two substantially equal portions. The term "intra-median zone" refers to that portion of the chamber radially internal of the imaginary vertical median plane. As a result of the vibrational motion imparted to the finishing chamber, the finishing mixture is caused to travel in an orbital path upwardly directed in the extra-median zone. Greatest lifting efficiency will be realized when the lower end of the elevator duct is placed entirely in the extra-median zone. However, where the utmost efficiency is not required, the lower end of the duct may be placed so that a portion thereof extends into the intra-median zone. In all cases, however, the lower end of the elevator duct should be generally positioned within the extra-median zone. As used herein, the term "generally" means that a sufficient portion of the lower end or entry port of the elevator duct should be positioned in the extra-median zone to cause the finishing mixture to rise in the duct.

Affixed to the upper end of the duct 44 is a separation apparatus 50 comprising a tray 51 having a screen 52 in the bottom thereof, and terminating in a discharge spout 53 for guiding the discharged parts to a suitable receptacle or conveyance.

In the embodiment shown in FIGS. 1–3 the diaphragm 40 forms the forward wall of the duct 44 and the wall of the chamber 5 forms the side wall of the duct. However, if desired, the duct 44 may be provided with separate walls. This is of course necessary when the diaphragm 40 is dispensed with, as it may be for certain applications. In other embodiments, as for example in the spiral or helical arrangements illustrated in U.S. Patent No. 3,161,993, a screen or chute or discharge trough having a screen in the bottom thereof may be used for separating the finishing material. If desired, a dam or other form of barrier may be used to separate the finishing chamber from the separating area, causing a rise in the level of the finishing mixture just upstream from the finishing area and increasing somewhat the normal "hold-up" of the finishing mixture in the machine.

The elevator duct 18 may be provided in any of a number of different embodiments. In the preferred form it comprises a vertical tube, as shown in FIGS. 1 and 3. Alternatively, the tube may be inclined from the vertical. If an inclined tube is used, it may, if desired, be provided with vanes or baffles to assist the upward movement of the finishing mixture. The tube used as the elevator duct may have a cross-section which is round, elliptical or otherwise ovular, rectangular, or any other geometric form such as hexagonal, octagonal, or the like.

Figure 6:
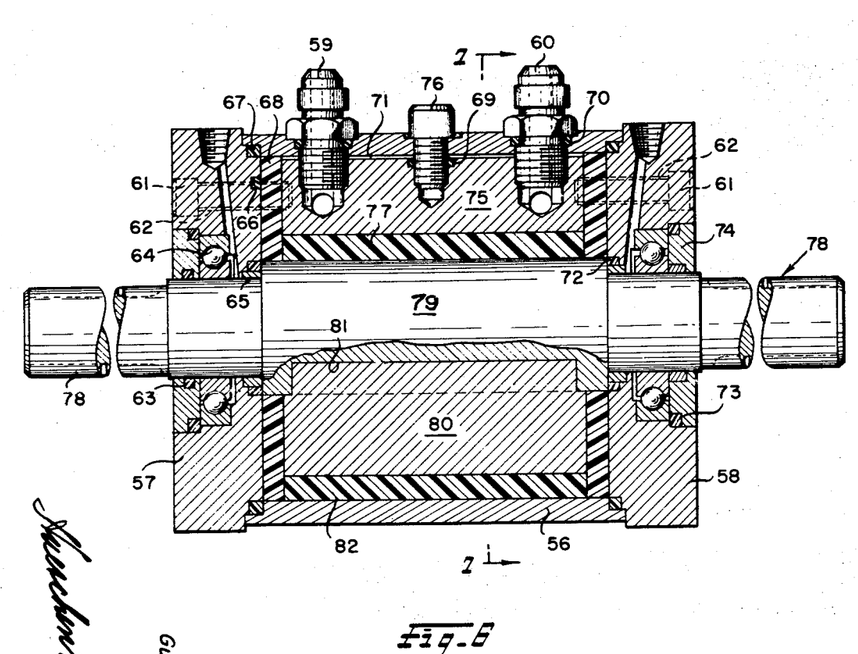
FIG. 6 is a fragmentary longitudinal sectional view taken at the line 6—6 of FIG. 4.
Figure 7:
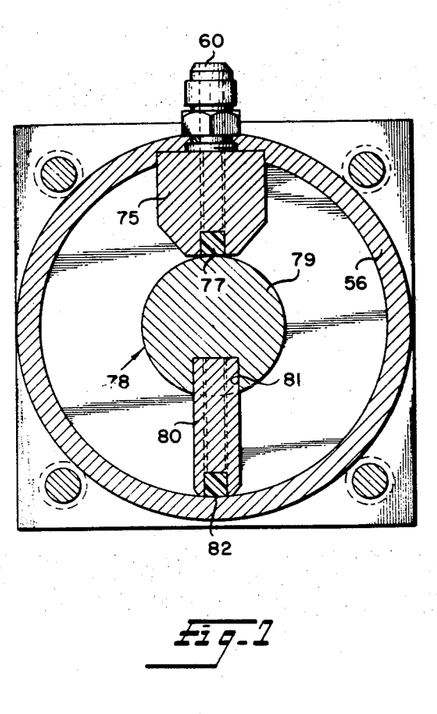
FIG. 7 is a cross-sectional view taken at the line 7—7 of FIG. 6.

In FIGS. 6 and 7 the rotary actuator 26 is shown in detail, and comprises a cylindrical body 56, heads 57 and 58 and connector fittings 59 and 60. The heads are affixed to the body by means of hexnuts 61 and tie rods 62. The apparatus also comprises assorted bearings and seals comprising an inner retainer nut seal 63, a ball bearing assembly 64, a thrust bearing 65, a stator seal 66, a head seal 67, a vane and stator U seal 68, a stator bolt seal 69, a connector seal 70, a gasket 71, a shaft seal 72, an outer retainer nut seal 73, and a bearing retainer nut 74. A stator 75 is affixed in place to the body 56 by means of a stator bolt 76. A Teflon backup seal 77 is retained in a groove provided in the stator. The rotating portion of the apparatus comprises a shaft 78 having a rotor 79 mounted thereon and a vane 80 engaged by the rotor 79 in a retaining groove 81. A vane seal 82 is mounted at the edge of the vane in a retaining groove.

Figure 8:
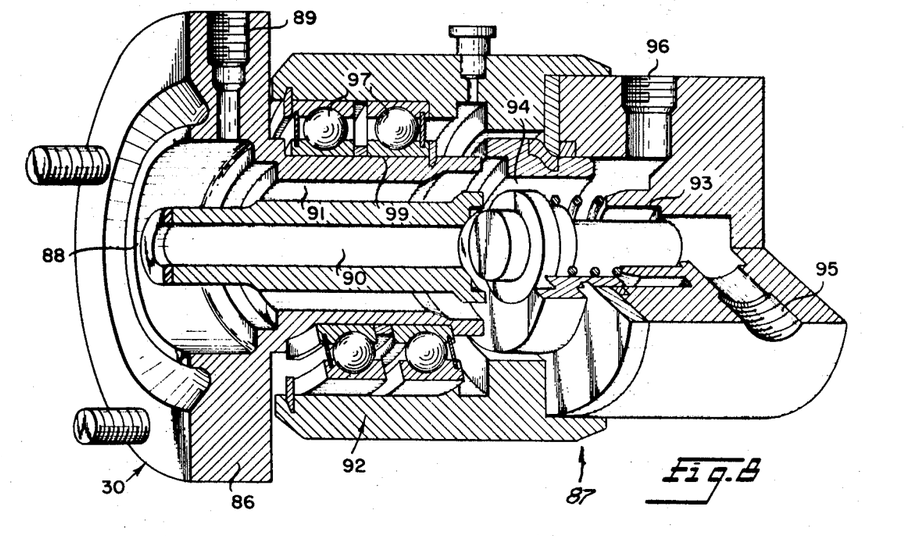
FIG. 8 is a sectional view taken at the line 8—8 of FIG. 4.

Referring to FIG. 8, the rotary coupling 30 is shown in detail and comprises a stator 86 and a rotor 87. The stator comprises fluid ports 88 and 89 leading to ducts 90 and 91. The rotor comprises a housing 92 having fluid ducts 93 and 94 connecting with the ducts 90 and 91, respectively. The ducts 93 and 94 terminate in ports 95 and 96, respectively, into which fittings may be inserted. Ball bearing assemblies 97 and 97 permit the housing 92 to rotate over a bearing surface 99 of the stator 86.

The finishing machine is operated by charging parts and finishing medium into the receiving zone 41. The vibratory motor 9 is energized and rotates preferably but not necessarily in the direction indicated by the arrow in FIG. 1. Because of the relative placement of the eccentric weights 10 and 17, the trough 5 is caused to vibrate and to impart motion to the mixture within the housing. Two components of vibratory motion are produced. The first causes the finishing mixture to move in an orbital path as shown by the arrows in FIG. 2. The second imparts to the finishing mixture linear processional motion in a direction substantially perpendicular to the plane of orbital motion, that is, in the direction of the arrow shown in FIG. 1. As the process continues, the orbital motion produces relative motion between the parts and the finishing material, causing the parts to be finished, and the entire mixture moves along the trough to the discharge zone 42. When the mixture reaches the discharge zone, primarily the upwardly directed orbital motion in the extralinear zone, and to a smaller extent the linear motion of the mixture, causes the mixture to be forced into the entrance at the lower end 45 of the elevator duct 44, and to rise upwardly along the duct. The mixture continues to rise until it reaches the discharge or exit port at the upper end 46 of the elevator duct 44, at which point it is discharged onto the screen 52 of the tray 51. The mesh size of the screen is so chosen that the finishing material falls through the screen and returns to the starting zone 41. The parts continue along the screen through the discharge spout 53 where they are discharged.

To vary the velocity of linear procession of the finishing mixture or to stop it completely, either with the apparatus in operation or with the apparatus in stationary condition, compressed air is applied to the hoses 101 and 102 through control valves, not shown. The compressed air is transferred by means of the rotary coupling 30 to the ducts 34 and 35. The air is then introduced into the rotary actuator 26. The actuator is caused to rotate to one limiting position or the other, depending upon the duct to which the compressed air is applied. The actuator rotates the adjustable weight 17 by means of the shifting arm 28 operating through the drive pin 29. The actuator and its linkage to the weight 17 may be so adjusted that one limiting position of the actuator places the weight in the position in which the forward linear motion or procession of the finishing mixture is a maximum, and at the other limit the position in which it is a minimum, which may be stationary or even reversed. Alternatively, an actuator which is continuously adjustable over a range of positions may be utilized. The proper placement of the eccentric weight 17 may then be determined while the effect of the placement is being observed with the apparatus in motion.

During operation of the finishing apparatus, if it is desired that the finishing material have a long dwell period in the finishing chamber, the control valve of the compressed air system is adjusted to introduce compressed air rotating the eccentric weight to the position in which little on no forward linear motion of the finishing mixture takes place. Subsequently, when the finishing process has been completed, the air valve may be turned to the position where compressed air is applied to the other air duct, thereby rotating the actuator in the opposite direction to its limiting position and placing the eccentric weight in such a position thatt he finishing mixture is caused to move linearly forward at a rapid rate. The force of the linear motion may thus be controllably augmented to force the finishing mixture to rise into the discharged zone and the finished parts to be separated and discharged. Separation of the parts from the finishing material may be accomplished by means of a screen as shown in FIGS. 1 and 2, by magnetic means, or by other suitable means known in the art. As already stated, other separating means may be employed with equal facility, especially in the helical or spiral type of device. Alternatively, the eccentric weight may be so adjusted that the finishing mixture moves forward slowly, the finishing process being complete when the finishing mixture reaches the end of the finishing chamber. The rate of forward travel may then be increased by moving the eccentric weight 17, and increasing the forward motion of the mixture until the parts are discharged. If desired, the eccentric weight 17 may be adjusted to provide only a slow rate of procession, with a switch provided at the discharge zone of the chamber which is actuated by contactual, magnetic, or proximity influence of the parts, and which causes the eccentric weight to be rotated automatically to the position where the procession of the finishing mixture is increased to cause it to enter the separation and discharge zone.

The present apparatus has been described in terms of apparatus designed to be air operated. However, by proper modifications, apparatus utilizing any type of fluid for transferring power to rotate the adjustable weight 17 may be utilized, as for example, a liquid material such as oil, water, etc. Alternatively, the adjustable eccentric weight may may be electrically operated. In that case, the rotary coupling may be replaced by electrical forms of transferring means such as slip rings. The actuator may be replaced by an electric motor and gear arrangement. The important feature of the invention is that means be provided for transferring the power transferring medium from the stationary portion of the apparatus to the rotating portion of the apparatus, and rotating actuating apparatus be provided which can be operated upon by the power transfer medium.

The ability to vary the relative positions of the eccentric weight permits a large variety of different procedures to be utilized without the necessity for stopping the apparatus to make the necessary adjustment. For example, the apparatus may be controlled by automatic timers to render it automatic. A timer can be set to move the adjustable eccentric weight 17 from the stationary position to the high processional position every ten minutes to discharge parts after a ten minute dwell period. Alternatively the rate of procession may be slowed down to provide the desired dwell period before the parts reach the discharge zone. When the parts reach the discharge zone, they can be arranged to trip a switch, thereby momentarily increasing the rate of procession to permit the parts to be discharged.

In still another embodiment the invention may comprise a method in which a plurality of cycles of increased and decreased (even stationary) linear processional motion are employed. The links of the various periods may be so chosen that a number of such cycles take place from the time a part or other object enters the finishing or treating zone until it is completely finished or otherwise treated and discharged. Utilizing this method, individual parts may be introduced into the treating zone to coincide with a particular portion of each cycle. A plurality of articles may then be continuously processed while maintaining the articles in spaced apart relationship depending upon the parameters of rate of linear motion, length of period of time for each part of the cycle, and other factors. The process may be so timed that a part reaches the discharge portion of the treating zone when a period of increased linear motion takes place, thereby facilitating the discharge of the part, particularly when it must rise in a discharge duct or over a dam or other barrier positioned at the end of the finishing or treating zone.

Figure 9:
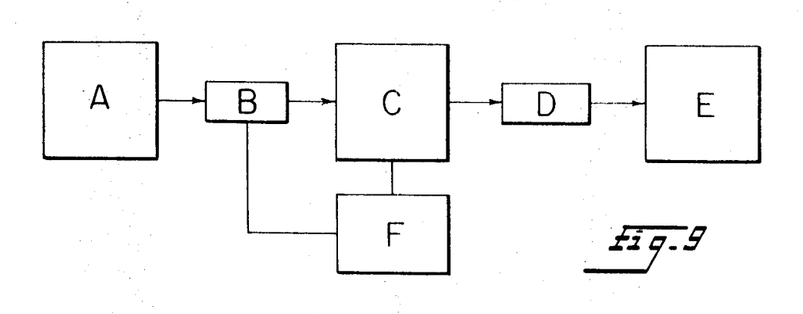
FIG. 9 is a diagrammatic representation of a novel method of practicing the invention.

FIG. 9 diagrammatically illustrates a continuous method of utilizing a vibratory finishing machine according to the invention. The apparatus may be one of a number of different types. One type which may be utilized is the apparatus illustrated in FIGS. 1–3 of the drawings and having an annular finishing chamber. Another type which may be used is a vibratory machine having a helically arranged finishing chamber, for example as shown in U.S. Patent No. 3,161,993. In either type of apparatus, by utilizing cycles comprising periods of increased linear processional velocity and decreased or zero linear processional velocity, continuous methods may be devised wherein the dwell time in the finishing chamber is not limited by the length of the chamber. Moreover, during a part of the cycle, although the linear velocity is reduced or is completely stopped, this does not interfere with the ultimate discharge of the parts from the finishing chamber, since the discharge step can be accomplished during the increased linear processional velocity period of the cycle. For example, in the apparatus shown in FIGS. 1–3, it is necessary for the mixture to rise in the elevator duct 44, and in the helical type of apparatus disclosed in the above-identified patent it is necessary for the parts to rise over a dam or small partition which is at times advantageously utilized to separate the finishing chamber from the separation stage. The increased linear processional motion during that part of the cycle is sufficient to accomplish the ejection of the parts, while at the same time the low or zero linear velocity during the other period of the cycle accomplishes the objective of permitting the required dwell time.

In the apparatus shown diagrammatically in FIG. 9, the parts are stored in the bin or hopper A. During operation of the machine the parts are transferred to the feeding stage B which feeds parts at the desired time to the chamber of the vibratory finishing machine C. This part of the machine, as described previously, has means for changing the adjustable eccentric weight to increase or decrease linear velocity while the apparatus is in motion. The finished parts are transferred during a period of increased linear velocity to the separating stage D where the parts are separated from the finishing material and subsequently transferred to a storage or to subsequent operational apparatus E. In order to provide a continuous process, an automatic timer F is provided which actuates the apparatus either to the increased or to the decreased linear processional velocity condition. The length of either the increased or decreased velocity period may be selected at will. For example, it has been found that a practical arrangement is to provide a decreased velocity or dwell period of 15 seconds and an increased velocity or feed period of 5 seconds. The timer F automatically provides these periods, and additionally can be set to feed a part or group of parts at any particular portion of the cycle. Where it is desired that individual parts do not touch each other, individual parts may be caused to be fed into the machine at a predetermined point of each cycle. The succeeding part is not introduced until the first part has traveled a certain distance during the feed or increased velocity portion of the cycle. Consequently, each part is introduced at spaced intervals and the intervals are maintained throughout the process, with individual parts being discharged during each feed period.

Figure 10:
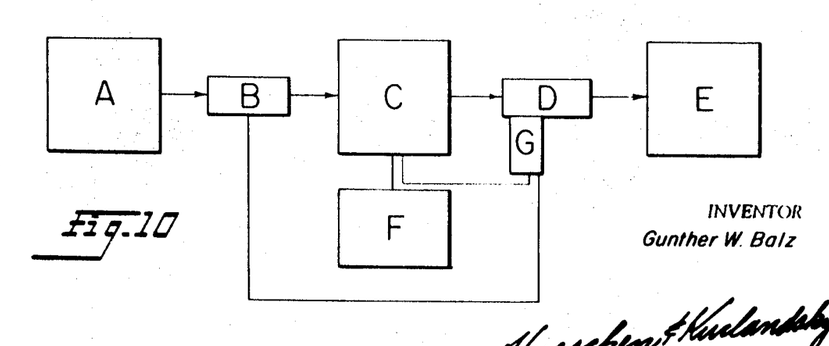
FIG. 10 is a diagrammatic representation of another method of practicing the present invention.

In FIG. 10 is shown in diagram a modified continuous method. The stages labeled A, B, C, D, E, and F are the same as enumerated with regard to FIG. 9. Additionally a sensing device G is utilized at the separatory stage. While the apparatus is being filled, it can be operated in much the same manner as that shown in FIG. 9. Then the timer F is set to define a period in which the apparatus is in the dwell mode, a period for example of 15 seconds. At the end of the dwell period, the timer actuates the machine to initiate the feed period. Once the feed period is attained, the timer F temporarily loses control and the feed period continues until a part is discharged from the finishing apparatus into the separating stage D. At this point the sensing device G senses the presence of the part and automatically restores the finishing machine C to the dwell mode and at which time the timer is again actuated to begin the timing of the dwell period. Additionally, the sensing device G may be connected to the feeding stage B to cause a part or group of parts to be introduced into the finishing stage C each time the sensing device is actuated by the presence of a part. The sensing device may be any type used in the art and may be contactually actuated by the part, magnetically actuated, or actuated by the proximity of the part, as for example by electrical capacitance between the part and the sensing device. Many other forms of automatic operation may be devised by those skilled in the art.

It is to be understood that the invention is not limited to the exact details of construction, operation, or exact materials or embodiments shown and described, as obvious modifications and equivalents will be apparent to one skilled in the art.

I claim:

1. In a finishing machine for finishing the surface of a part comprising a frame supporting a housing mounted for vibration, said housing defining a finishing chamber, vibratory means operatively associated with said housing for subjecting a mixture comprising said part and a finishing material to vibration comprising a motor having a vertically oriented shaft and an eccentric weight mounted on said shaft, the improvement wherein an adjustable eccentric weight assembly is mounted at the other end of said shaft, said assembly comprising an eccentric weight adjustably mounted with respect to said shaft, fluid- or electrically-operable actuator means engaging said eccentric weight and adapted to move said eccentric weight between each of at least two selected positions, and rotary coupling means adapted to transfer fluid or electrical power to said actuator means.

2. In a finishing machine according to claim 1, the improvement wherein in one position of said adjustable eccentric weight said finishing mixture is provided with increased forward linear processional motion and in the other position with decreased forward linear processional motion.

3. In a finishing machine according to claim 1, the improvement wherein in one position of said adjustable eccentric weight said finishing mixture is provided with increased forward linear processional motion and in the other position said finishing mixture remains substantially stationary with respect to linear processional motion.

4. In a finishing machine according to claim 1, the improvement wherein said adjustable eccentric weight is continuously adjustable within a predetermined range of positions.

5. In a finishing machine according to claim 1, the improvement wherein a switch is provided having sensing means positioned at the discharge portion of said finishing chamber and adapted, when actuated by sensing said part, to cause said adjustable eccentric weight to be moved to a position in which the rate of linear procession of said finishing mixture is decreased.

6. The finishing machine according to claim 1 wherein the actuator means is fluid operable and the rotary coupling means has a portion thereof fixed in relation to said finishing machine and another portion thereof fixed in relation to said motor shaft and adapted to transfer said fluid from said fixed portion to said rotary portion, and is provided with means for conducting said fluid from said rotary coupling means to said actuator means.

7. In a finishing machine according to claim 6, the improvement wherein said fluid is compressed air.

8. In a finishing machine according to claim 6, the improvement wherein said fluid is a hydraulic liquid.

9. In a finishing machine according to claim 1, the improvement wherein said actuator means is electrically operable and said rotary coupling means is adapted to transfer electricity from a stationary supply source to said actuator means.

References Cited

UNITED STATES PATENTS

| | | | |
|---|---|---|---|
| 3,020,683 | 2/1962 | Brandt | 51—163 |
| 2,677,967 | 5/1954 | Galbraith | 74—87 |
| 2,728,237 | 12/1955 | Galbraith | 74—87 |
| 3,266,739 | 8/1966 | McKibben | 51—163X |
| 3,100,088 | 8/1963 | Podmore | 51—163X |

HAROLD D. WHITEHEAD, Primary Examiner

U.S. Cl. X.R.

74—87